Nov. 24, 1936.    A. W. SPENCER    2,061,855
SUPPORT FOR BATHROOM ARTICLES AND THE LIKE
Filed Sept. 27, 1935

Inventor,
Allard W. Spencer,
by Roberts, Cushman & Woodbury
Attys.

Patented Nov. 24, 1936

2,061,855

UNITED STATES PATENT OFFICE 2,061,855

SUPPORT FOR BATHROOM ARTICLES AND THE LIKE

Allard W. Spencer, Winchester, Mass., assignor to J. P. Eustis Manufacturing Company, Cambridge, Mass., a corporation of Massachusetts Application September 27, 1935, Serial No. 42,474

2 Claims. (Cl. 248—225)

This invention relates to supports for bathroom articles and the like, for example, holders for tumblers, tooth brushes, towels, etc., and has for its objects to provide a support which may be rigidly attached to a wall or other surface with an extensive bearing surface on the wall and without exposing to view the screws or other devices employed to secure the support to the wall, to facilitate the attachment of the support to a supporting surface and at the same time to improve the appearance of fixtures of the character referred to.

According to this invention the support comprises a base member or wall plate having openings for attaching the plate to a wall and a stem fast to the plate and extending outwardly therefrom, with a cover member or collar surrounding the stem and covering the openings in the wall plate when secured in position over the plate. The collar is secured in position by means responsive to movement of the collar relatively to the plate, preferably by a threaded connection with the stem adjacent the plate, whereby the means for attaching the collar is concealed by the collar. To facilitate the removal of the collar from the plate the portion of the stem adjacent the plate, which lies within the collar when the latter is in normal position, preferably has a larger diameter than the forward portion of the stem so that the collar, when disconnected from the plate, may move along the stem with facility and without scratching the stem. When the stem is bent, as it usually is, the diameter of the portion adjacent the plate is preferably sufficiently larger than the diameter at the bend that the collar may be moved freely around the bend to give better access to the plate in attaching the latter to the wall.

In a more specific aspect the invention comprises two flat circular disks of different diameters, the smaller disk being superposed over the larger disk and having a central opening to accommodate the aforesaid stem. The smaller disk is preferably formed of different material than that of the stem and plate to avoid corrosive adhesion between the parts, the plate and stem preferably comprising chrome-plated brass and the collar consisting of bakelite.

Figure 1:
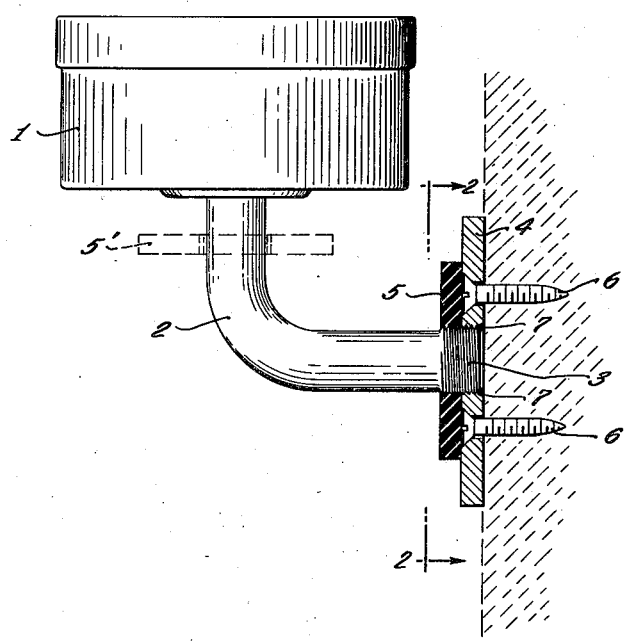
Figure 2:
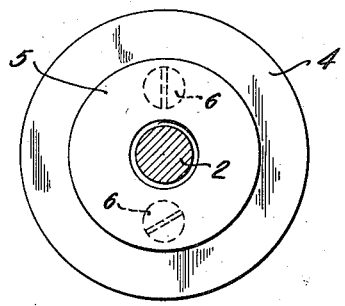

For the purpose of illustration a typical embodiment of the invention is shown in the accompanying drawing in which, Fig. 1 is a side elevation with parts shown in section; and Fig. 2 is a section on line 2—2 of Fig. 1.

The particular embodiment of the invention chosen for the purpose of illustration comprises a cylindrical tumbler cup 1 mounted on the upper end of a bent stem 2, the other end 3 of the stem being enlarged and provided with threads for receiving the base plate 4 and the collar 5 which comprise circular disks of chromium-plated brass and bakelite respectively. The base plate 4 is provided with openings to receive screws 6 for attaching the fixture to a wall and the collar 5, while smaller than the plate 4, is large enough to cover the screw openings. As indicated at 7 the threaded connection between the enlarged portion 3 of the stem and the plate 4 is preferably indented after these two parts are threaded together to prevent rotation of the stem relatively to the plate. The enlarged portion 3 of the stem is sufficiently larger than the remaining portion 2 of the stem so that the collar 5, when unthreaded from the enlarged portion, may be moved around the bend in the stem to the position indicated at 5' to give better access to the screw openings in mounting the fixture on the wall. After the screws have been inserted the collar or ring is moved down along the stem and threaded on the enlarged portion 3 to the position shown in full lines in Fig. 1.

It should be understood that the present disclosure is for the purpose of illustration only and that this invention includes all modifications and equivalents which fall within the scope of the appended claims.

I claim:

1. A support for bath-room articles and the like comprising a wall plate having openings for attaching the plate to a wall, a stem fast to the plate and extending outwardly therefrom, a collar disposed around said stem over said openings, said collar having an opening for said stem and the stem being exposed beyond the forward end of the opening to support a bath-room article thereon, and concealed means for detachably holding the collar in position over said plate.

2. A support for bath-room articles and the like comprising a wall plate having openings for attaching the plate to a wall, a stem fast to the plate and extending outwardly therefrom and a collar mounted around said stem over said openings, said collar having an opening for said stem and the stem being exposed beyond the forward end of the opening to support a bath-room article thereon, the stem substantially filling the opening in the collar when the latter is mounted over the plate but having a smaller diameter beyond the collar so that the latter may be moved therealong without scratching the stem.

ALLARD W. SPENCER.